United States Patent
Tzeng et al.

(10) Patent No.: US 6,714,542 B1
(45) Date of Patent: Mar. 30, 2004

(54) APPARATUS AND METHOD FOR STORING MIN TERMS IN A CENTRAL MIN TERM MEMORY FOR EFFICIENT SHARING BY A PLURALITY OF NETWORK SWITCH PORTS

(75) Inventors: Shr-jie Tzeng, Fremont, CA (US); Peter Ka-Fai Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/562,291

(22) Filed: May 1, 2000

(51) Int. Cl.[7] .............................................. H04L 12/56
(52) U.S. Cl. ........................ 370/392; 370/389; 370/400
(58) Field of Search ................................ 370/392, 428, 370/466, 467, 474, 400

(56) References Cited

U.S. PATENT DOCUMENTS

| | | | | |
|---|---|---|---|---|
| 5,414,704 A | * | 5/1995 | Spinney ....................... 370/389 |
| 5,654,985 A | * | 8/1997 | Crayford et al. ............. 375/211 |
| 5,953,335 A | | 9/1999 | Erimli et al. |
| 6,157,955 A | * | 12/2000 | Narad et al. ................. 709/228 |
| 6,438,145 B1 | * | 8/2002 | Movshovich et al. ....... 370/536 |
| 6,678,272 B1 | * | 1/2004 | Tzeng ........................ 370/392 |
| 6,678,276 B1 | * | 1/2004 | Tzeng et al. ............. 370/395.7 |

* cited by examiner

Primary Examiner—Kenneth Vanderpuye
Assistant Examiner—Joshua Kading
(74) Attorney, Agent, or Firm—Manelli Denison & Selter PLLC; Leon R. Turkevich (57) ABSTRACT

A network switch, configured for performing layer 2 and layer 3 switching in an Ethernet (IEEE 802.3) network without blocking of incoming data packets, includes a plurality of network switch ports each having a filter (i.e., a packet classifier module) configured for evaluating an incoming data packet on an instantaneous basis. The filter performs simultaneous comparisons between the incoming data stream of the data packet and multiple templates configured for identifying respective data protocols, enabling the network switch to perform layer 3 switching for 100 Mbps and gigabit networks without blocking in the network switch. Each template is composed of a plurality of min terms, wherein each min term specifies a prescribed comparison operation within a selected data byte of the incoming data packet. The templates may be programmed by a user and stored in a central min term memory separate from each network switch port. A min term controller controls the fetching of min terms from the min term memory eliminating the need to store all min terms at each network switch port.

13 Claims, 7 Drawing Sheets

APPARATUS AND METHOD FOR STORING MIN TERMS IN A CENTRAL MIN TERM MEMORY FOR EFFICIENT SHARING BY A PLURALITY OF NETWORK SWITCH PORTS

BACKGROUND OF THE INVENTION

1. Field of the Invention

The present invention relates to layer 2 (and above) switching of data packets in a non-blocking network switch configured for switching data packets between subnetworks and more particularly to the sharing of min term memory in a multi-port network.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1 q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 and above switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate).

Arrangements have been proposed that enable a network switch port to provide layer 2 and above switching capabilities. Commonly assigned U.S. patent application Ser. No. 09/430,753, filed Oct. 29, 1999 and entitled "Apparatus And Method For Identifying Data Packet Types In Real Time On A Network Port Switch" discloses one such arrangement. However, when multiple network switch ports are provided in such arrangements, significant memory space is typically required at each network switch port due to the requirement of storing of all min terms locally at each network switch port. Such arrangements are inefficient and increase the cost of each network switch port.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that minimizes required memory space in a network switch port of an integrated network switch implemented on a silicon chip.

These and other needs are attained by the present invention, where a network switch includes a central min term memory configured for storing min term values configured for simultaneous comparison with corresponding incoming data bytes. The switch includes a plurality of network switch ports separate from and in communication with the central min term memory. Each network switch port includes a min term controller configured for fetching min term values from the central min memory; a min term generator configured for simultaneously comparing a received byte of the incoming data packet with the fetched min terms corresponding to the received byte and generating respective min term comparison results; and an equation core configured for generating a frame tag identifying the incoming data packet based on the min term comparison results relative to the templates.

One aspect of the present invention provides a method, in a network switch, of evaluating an incoming data packet received at a network switch port. The method includes receiving from a host controller a plurality of templates configured for simultaneous identification of respective data formats in the incoming data packet. Each template has at least one min term configured for comparing a corresponding prescribed value to a corresponding selected byte of the incoming data packet. The method also includes storing min terms in a min term memory separate from the network switch port. The method further includes requesting and retrieving from the min term memory, the min terms that correspond to the selected byte as the selected byte is received by the network switch port. The retrieved min terms are compared, by the network switch port, with the data bytes received to identify the incoming data packet.

Another aspect of the present invention provides a method of evaluating incoming data packets at a network switch. The network switch includes a plurality of network switch ports and a min term manager separate from and in communication with each network switch port. The min term manager includes a central min term memory. The method includes receiving from a host controller a plurality of templates configured for simultaneous identification of respective data formats in an incoming data packet. Each template is configured for identifying a prescribed format within the incoming data packet and having at least one min term configured for comparing a corresponding prescribed value to a corresponding selected byte of the incoming data packet. Each of the min terms is stored in the central min term memory. Bytes of the incoming data packet are simultaneously compared with a plurality of the templates by fetching, for each byte, a group of the stored min terms from the central min term memory and simultaneously comparing at a certain network switch port the corresponding byte with the corresponding fetched group of the stored min terms. A comparison result is generated based on min term results from the comparisons of the bytes relative to the plurality of templates.

Thus, by employing a central memory for min terms, the local memory of each network switch port need not contain all generated min terms, which reduces the size of the local memory and thus reduces cost.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
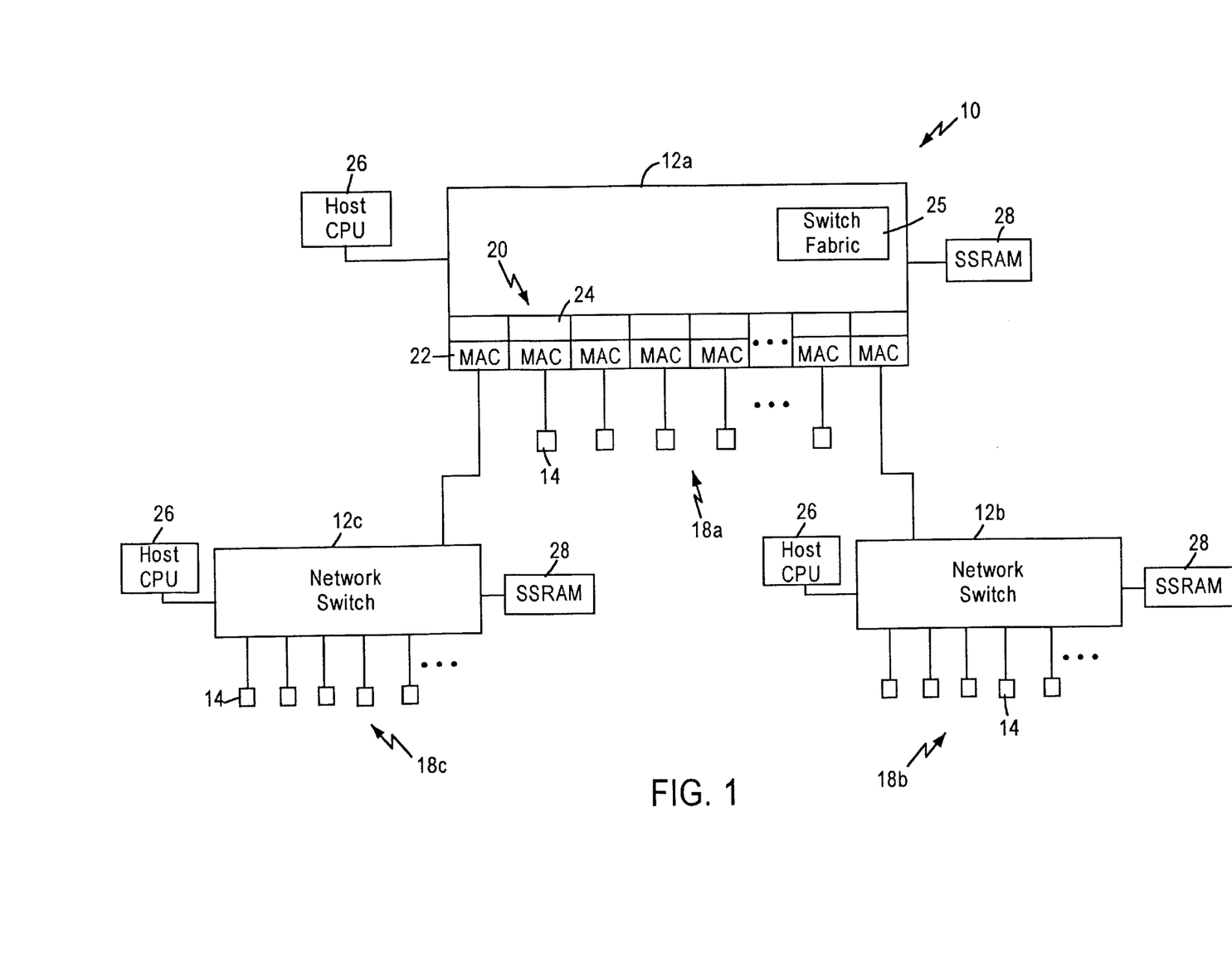
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 and a packet classifier module 24. The MAC module 20 transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12a to remotely program another switch, for example switch 12b, by sending a message having an IP address corresponding to the IP address of the switch 12b; the switch 12b, in response to detecting a message addressed to the switch 12b, can forward the message to the corresponding host CPU 26 for programming of the switch 12b.

Figure 2:
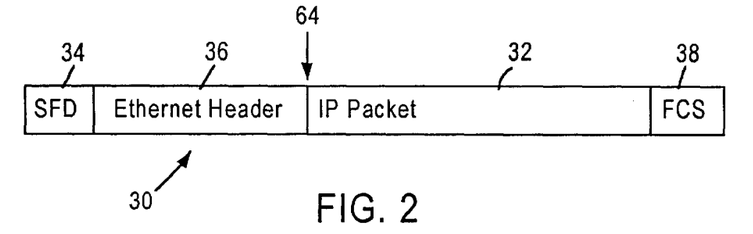
FIG. 2 is a diagram illustrating a conventional layer 2 Ethernet-type data packet carrying a layer 3 Internet protocol (IP) packet.

FIG. 2 is a diagram illustrating an Ethernet (IEEE 802.3) packet 30 carrying an IP packet 32 as payload data. Specifically, the Ethernet packet 30 includes a start frame delimiter (SFD) 34, an Ethernet header 36, the IP packet 32, and a cyclic redundancy check (CRC) or frame check sequence (FCS) field 38. Hence, a switch fabric 25 configured for layer 3 switching decisions needs to be able to quickly process the IP packet 32 within the received Ethernet frame 30 to avoid blocking of the frame within the switch.

Figure 3:
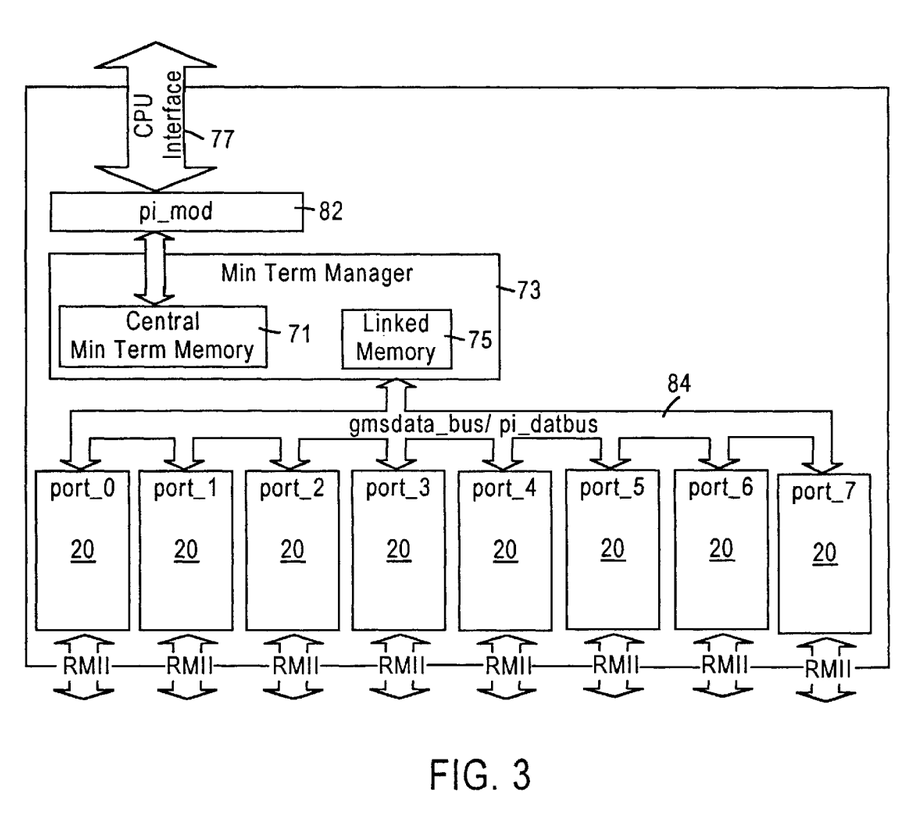
FIG. 3 is a block diagram illustrating a plurality of network switch ports in communication with a min term manager according to an embodiment of the present invention.

FIG. 3 is a block diagram showing a plurality of network switch ports 20 in communication a min term manager 73 in accordance with the principles of the present invention. In the illustrated embodiment, eight network switch ports 20 are shown which communicate with the min term manager 73 via interface 84. The min term manager 73 includes min term memory 71 which stores all min terms to be received by the ports 20 as will be explained more fully below. The min term manager 73 also includes linked memory 75 which stores a linked list identifying the relevant data bytes (by byte location) that are to be compared by the min terms stored in min term memory 71. The min term manager 73 communicates with a CPU via CPU interface 77 and a processor interface module 82 to transfer the min terms to the central min term memory 71.

According to the disclosed embodiment, the packet classifier module 24 of FIG. 1 is configured for multiple simultaneous comparisons between the incoming data stream and templates that identify the data format of the incoming data stream. Specifically, users of the host processor 26 will specify policies that define how data packets having certain IP protocols should be handled by the switch fabric 25. These policies are implemented by loading into the switch fabric 25 a set of frame forwarding decisions for each corresponding IP protocol type. Hence, the switch fabric 25 could include one set of frame forwarding instructions for an HTTP packet, another set of frame forwarding instructions for an SNMP packet, and another set of frame forwarding instructions for a high-priority packet (e.g., video, or voice, etc.).

Figure 4:
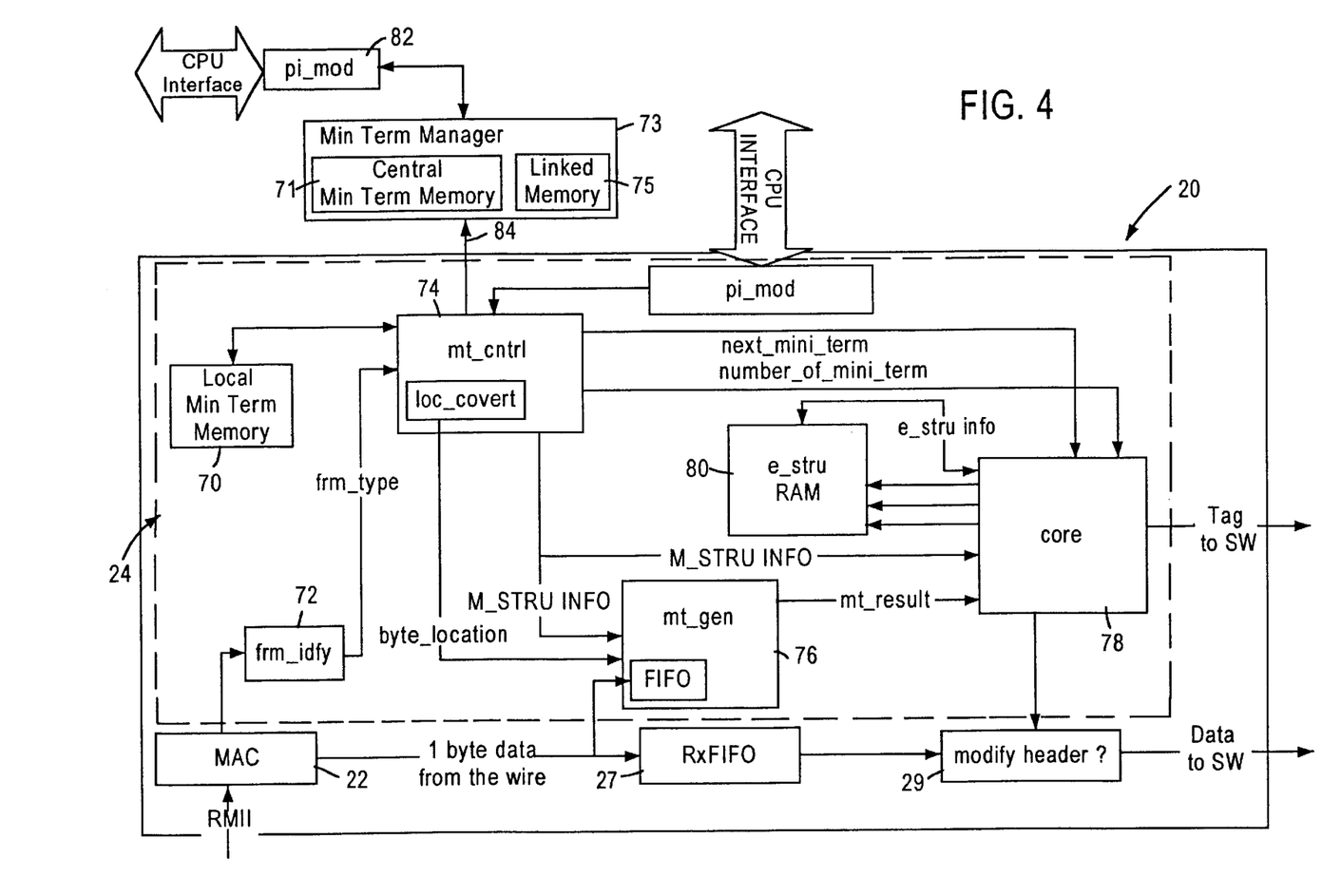
FIG. 4 is a block diagram illustrating a network switch port of FIG. 3 in communication with a min term manager, according to an embodiment of the present invention.

FIG. 4 is a block diagram illustrating a packet classifier module 24 of a network switch port 20, shown associated with a min term manager 73 in accordance with the invention. As shown, the network switch port 20 includes a MAC 22, a receive FIFO buffer 27, a header modifier 29, and the packet classifier module 24. The packet classifier module 24, also referred to as a network switch port filter, is configured for identifying (i.e., evaluating) the incoming data packet at the network switch port 20, and supplying to the switch fabric 25 a tag that specifies the action to be performed on the data packet based on type of data packet being received. Specifically, the packet classifier module 24 simultaneously compares the incoming data packet with a plurality of templates configured for identifying respective data formats. The packet classifier module 24, based on the comparison between the incoming data packet and the plurality of templates, identifies an equation to be executed that specifies the tag to be supplied to the switch fabric 25.

Specifically, the packet classifier module 24 generates a comparison result that identifies the incoming data packet by detecting at least one matched template from a plurality of templates. The packet classifier module 24 then identifies which of the equations includes the matched template, and generates the tag specified by the equation.

Figure 5A:
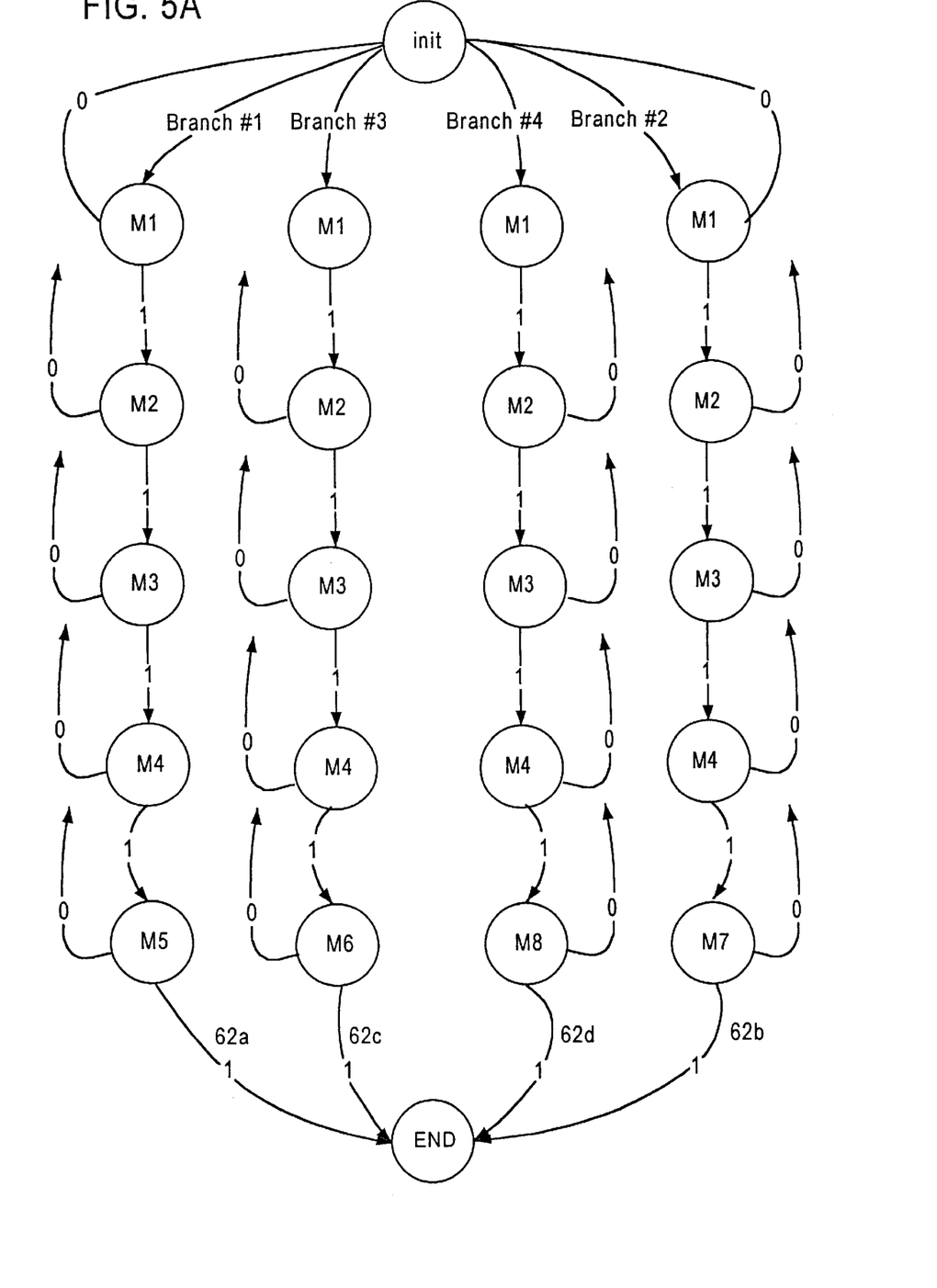
FIGS. 5A and 5B are each a diagram illustrating simultaneous processing of two templates of an equation by the min term generator of FIG. 4.
Figure 5B:
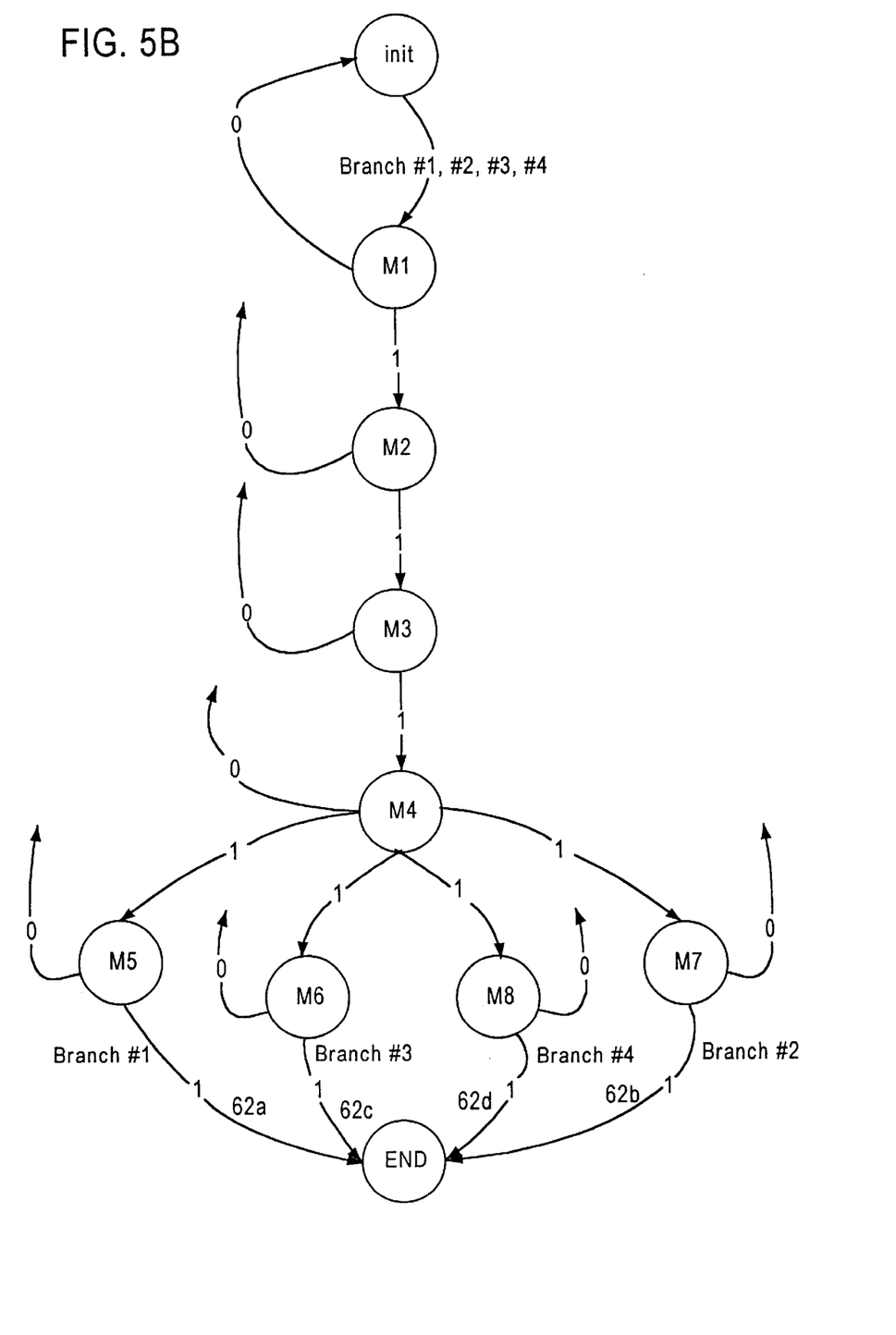

FIGS. 5A and 5B are diagrams illustrating the simultaneous processing of two templates of an equation by the packet classifier module 24. FIG. 5A illustrates the logical evaluation by the packet classifier module 24 of the equation:

Eq1=M1*M2*M3*M4*(M5+M6+M7+M8).

FIG. 5B illustrates how the equation Eq1 would actually be stored in the central min term memory 71. The equation Eq1 includes four templates 62a, 62b, 62c, and 62d: the template 62a includes the min terms M1, M2, M3, M4, and M5; the template 62b includes the min terms M1, M2, M3, M4, and M6; the template 62c includes the min terms M1, M2, M3, M4, and M7; and the template 62d includes the min terms M1, M2, M3, M4, and M8. Each template 62 corresponds to a specific IP data format recognizable based on the header of the IP data packet 32. For example, templates 62a and 62c may be configured for identifying an HTTP packet, and templates 62b and 62d be may be configured for identifying an SNMP packet. Specifically, an HTFP packet is identified if it is in IPv4 format, the time to live field in IP is bigger than one, the protocol field in IP header is TCP, header checksum is correct, source TCP port is 80 or destination TCP port is 80. An SNMP packet is identified if it is in IPv4 format, the time to live field in IP is bigger than one, the protocol field in IP header is TCP, header checksum is correct, source TCP port is 25 or destination TCP port is 25.

Hence, the following min terms may be established to represent all the above-described criteria:

M1=packet is in IPv4 format
M2=time to live field in IP is bigger than one
M3=protocol field in IP header is TCP
M4=header checksum is correct
M5=source TCP port is 80
M6=destination TCP port is 80
M7=source TCP port is 25
M8=destination TCP port is 25

Hence, the templates 62a and 62c identify HTTP packets, and the templates 62b and 62d identify SNMP packets. Thus, equation one (Eq1) specifies that a specific result (e.g., the tag having a specified value) should be output to the switch fabric 25 if either template 62a, 62b, 62c, or 62d are true.

Figure 6:
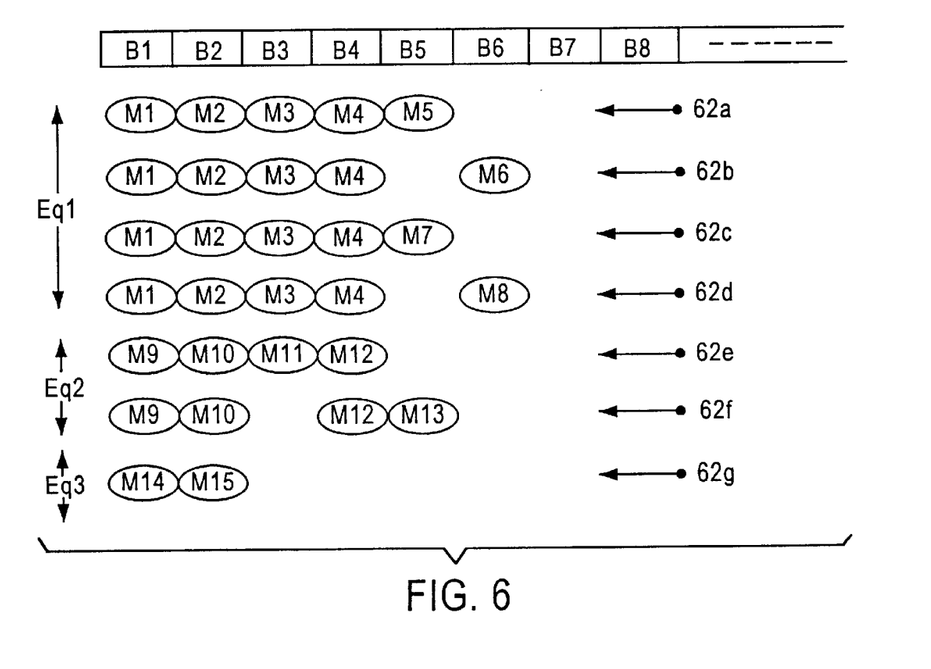
FIG. 6 is a diagram illustrating in further detail the simultaneous processing of min terms by the min term generator of FIG. 4.

Moreover, the min terms M1 . . . M8 are arranged within the associated templates 62a and/or 62b in a prescribed order that corresponds to the relative position of a data byte in the incoming data stream. As illustrated in FIG. 6, the min term M1 is configured for comparison with the first byte (B1) of the IP packet 32, the min term M2 is configured for comparison with a subsequent byte (B2) of the IP packet 32 that follows B1, the min term M3 is configured for comparison with a subsequent byte (B3) that follows B2, etc. Hence, the use of templates 62 having min terms in an order based on the relative position of a data byte in the incoming data stream enables multiple simultaneous comparisons between the incoming data stream and min terms. Hence, an incoming data packet can be compared to multiple templates to determine not only the data format of the incoming data packet, but also what action needs to be performed by the switch fabric 25.

FIG. 4 is a block diagram illustrating in detail the packet classifier 24 of FIG. 1, shown associated with the min term manager 73, which is separate from each network switch port 20. As shown in FIG. 4, the packet classifier 24, also referred to as a network switch port filter, includes a local min term memory 70. The local min term memory 70 stores the min term values (e.g., M1, M2, etc.) which are retrieved from the min term memory 71 of the min term manager 73. The packet classifier 24 also includes a frame identifier 72 configured for identifying the type of layer 2 information being received. In particular, identifying the type of layer 2 information being received (e.g., Ethernet, IEEE 802 to 3, etc.) enables identification of the start position 64 of the IP packet 32 within the layer 2 packet 30. The packet classifier 24 also includes a min term controller 74, a min term generator 76, an equation core 78, and an evaluation results memory 80. The min term controller 74 is configured for fetching the stored min terms from the min term memory 71, of the min term manager 73, corresponding to a selected byte of the IP frame 32. Advantageously, since all min terms are stored in the central min term memory 71, the local min term memory 70 of each network switch port 20 need not contain all generated min terms, which reduces the size of the local memory 70 and thus reduces cost. For example, the local min term memory 70 can be configured to store sixty-four entries while the central min term memory 71 can be configured to store about two thousand entries.

The min term controller 74 also includes a location converter configured for specifying the actual byte location (byte_location) of the start point 64 in response to receiving a frame type (frm_type) signal from the frame identifier 72 that specifies the type of layer 2 information.

Figure 8:
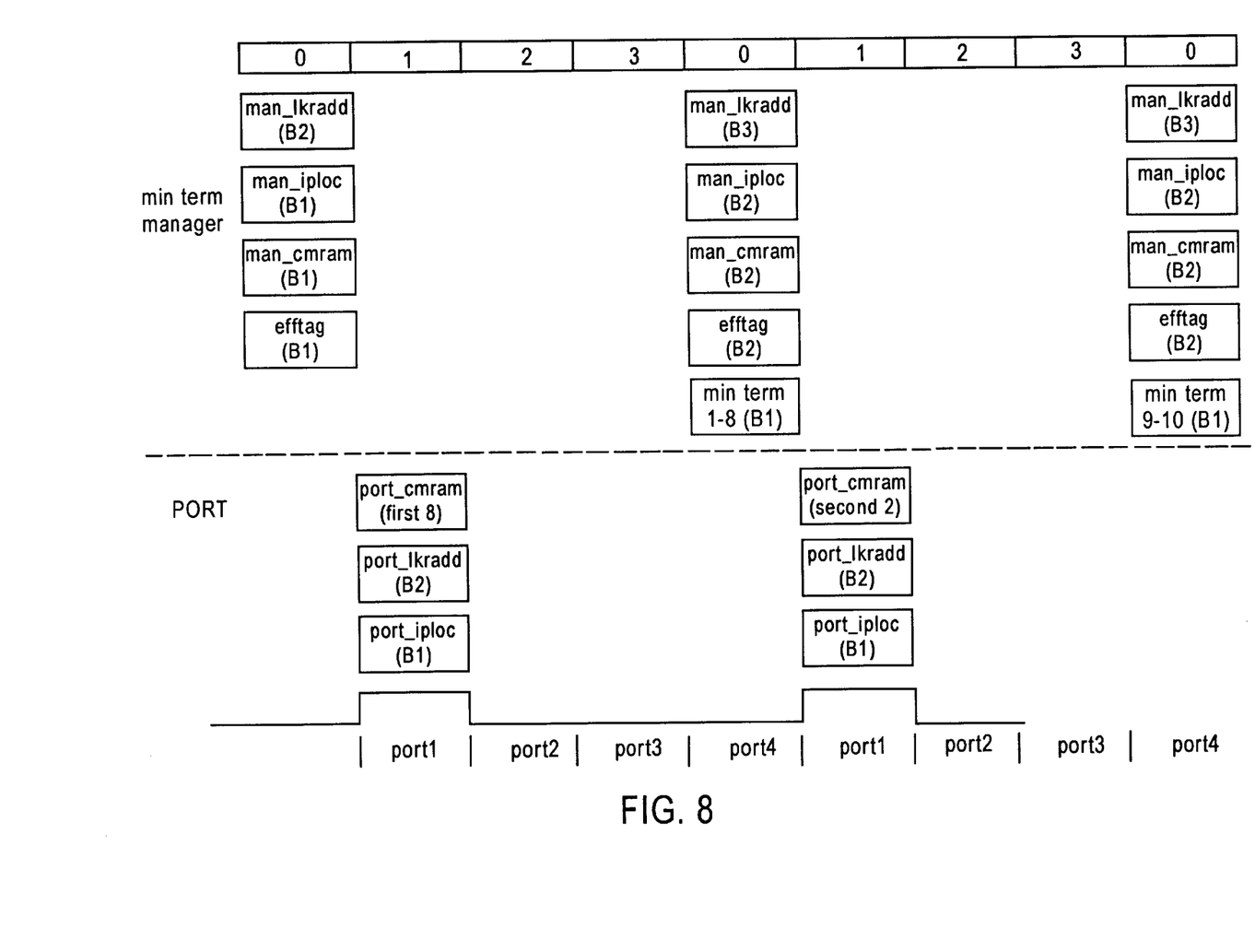
FIG. 8 is a handshake diagram between a network switch port and a min term manager of the present invention.

When the data packet is received by a network switch port 20, the corresponding min term controller 74 sends an initial request to the min term manager 73. With reference to FIGS. 6 and 8, the min term manager 73 sends the port 20 data such the location (man-iploc) of the first relevant byte (e.g., B1) needed to be analyzed in the template, the base address (man-cmram) of the min terms for the first relevant byte (B1) in the central memory 71, and the number (efftag) of min terms associated with the first relevant byte (B1), and the location (man-lkradd) of the next relevant byte (e.g., B2, via linked memory 75). The min term controller 74 then requests from the min term manager the relevant min terms by supplying the location (port-iploc) of the corresponding relevant byte (B1), and the address (port-cmram) of the min terms for the corresponding relevant byte (B1). The min term controller 74 also requests the identity of the next relevant byte by supplying the address location (port-lkraddr) of the next relevant byte (B2). In the embodiment, a maximum of eight min terms are fetched from the central min term memory 71 during a time slot. If all min terms related to a certain byte are not received in a time slot, the min term controller 74, based on the efftag, understands that all min terms have not been received. For example, if B1 includes ten min terms, eight min terms of B1 are received by the min term controller 74 during one time slot and two min terms of B1 remain at the min term manager 73. With reference to FIG. 8, the min term controller 74 then requests from the min term manager 73, the new port-cmram to obtain the remaining two min terms in its next time slot. The new port-cmram will be generated by the min term controller 74 which understands that there are still two min terms left in the central min term memory. Using this updated port-cmram, the min term controller 74 then requests the remaining min terms from the min term manager 73, as shown in FIG. 8.

Since the min term controller 74 is configured to decode and manage requests of the associated port 20 to control the transfer of min term data from the min term manager 73, the manager 73 need not provide control functions and thus may be of low cost. The min term manager 73 simply listens to what the min term controller 74 requests. The ports 20 are time slot sequenced and each port operates in its own sequence.

Hence the min term controller 74, in response to detecting the beginning of the IP packet, fetches the min terms from min term memory 71 that are to be compared with the first relevant byte (e.g., B1) of the IP packet 32, for example min terms M1, M9, and M14 for equations Eq1, Eq2, and Eq3 in FIG. 6 and stores the fetched min terms in the local min term memory 70. The min term controller 74 then forwards the min term values (M_STRU INFO) to the min term generator 76 and the equation core 78.

The min term generator 76 performs the actual min term comparisons between the min terms fetched by the min term controller 74 and the selected byte of the incoming data stream. For example, the min term generator 76 simultaneously compares in FIG. 6 the incoming data byte B1 with the min terms M1, M9, and M14, and provides the min term comparison results (mt_result) to the equation core 78. During the next comparison cycle, the min term generator 76 simultaneously compares the incoming data byte B2 with the min terms M2, M10, and M15. As noted above, the min term generator 74 is preferably configured for simultaneously comparing the incoming data stream to up to eight min terms.

The equation core 78 is configured for generating a frame tag based on the min term comparison results received from the min term generator 76, relative to the relevant templates 62. For example, the equation core 78 evaluates equation 1, illustrated in FIG. 5, by evaluating the min term results sequentially as the results are supplied from the min term generator 74. For example, if the comparisons for each of the min terms M1, M2, M3, M4, M5, and M6 result in a true condition, described below with respect to FIG. 7, then the end condition is matched in equation 1, causing the equation core 78 to generate a tag corresponding to the condition specified for equation 1. The frame tag identifies the incoming data packet, as well as the action that needs to be performed by the switch fabric 25.

Figure 7:
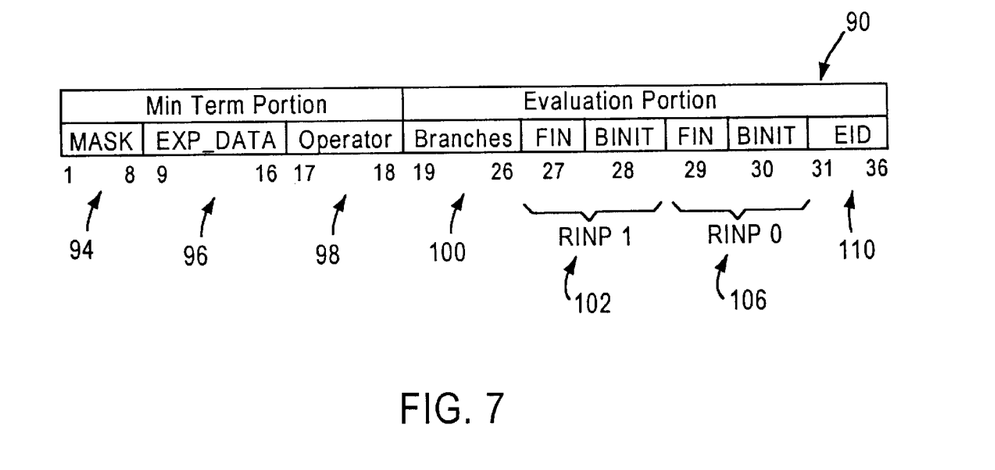
FIG. 7 is a diagram illustrating the structure of the central min term memory of FIG. 4 according to an embodiment of the present invention.

FIG. 7 is a diagram illustrating the data format of the min term structure in the central min term memory 71. According to the disclosed embodiment, the min terms are stored in the central min term memory 71 in an order corresponding to the relative position of the data byte to be compared. Hence, all min terms that are to be compared to the first data byte are stored together in a first part of the min term memory, followed by min terms to be compared with the second data byte, etc.

Alternatively, the min terms may be stored in an order based on relevant information within the IP header, as well as the relative position of the data byte to be compared. Hence, the min terms may be stored in an order for comparing the sequence of data bytes providing the source IP address, destination IP address, and source and source and destination ports.

Each table entry 90 includes a min term portion and an evaluation portion. The min term portion includes a mask field (MASK) 94, an expected data field (EXP_DATA) 96, and an operator field (OPERATOR) 98. Based on the position of the table entry 90 in the central min term memory 71, the min term controller 74 is able to determine which byte of the IP packet 32 that needs to be compared with the corresponding min term, relative to the beginning 64 of the IP packet. The mask field 94 is a mask that is used by the min term generator 76 in performing comparisons; if the mask has a bit set to 1, the value is compared, and if the mask value has zeros in the field, the comparison is a don't care. The expected data field 96 specifies the expected data to be compared with the relevant data byte of the IP packet 32. The operator field 98 specifies the type of comparison to be performed by the min term generator, for example: less than, less than or equal to, equal to, greater than, greater than or equal to, and not equal to.

The evaluation portion includes a branches portion 100, a response portion (RINP1) 102 for the case where the comparison of the min term portion is true, a second response portion (RINP0) 106 for the case where the comparison of the min term portion is false, and an equation identifier 110. The branches portion 100 specifies the order of the OR term in the equation; for example, the min term M1 as shown in FIGS. 5 and 6 would have its branches portion set to 0000 1111, indicating that the first four branches of the equation specified in the equation identifier field 110 are to include the corresponding min term. The use of eight bits for the branches portion assumes that there are a maximum of eight branches in any given equation.

The response portion 102 specifies the operation to be performed if the min term portion is evaluated as true relative to the compared data byte. In particular, the finish bit (FIN) is set to one if the results of the equation is determined if the min term result is true; the back to initial (BINIT) is set to one if the evaluation process should return to the initial state (init) if the min term result is true. For example, in the case of min term M1, the FIN bit and the BINIT bit of RINP1 are set to zero, since additional comparisons are needed if the min term result is true. In the case of min terms M5, M6, M7, and M8, the FIN bit of RINP1 is set to one, since a comparison result of "true" results in the end of the evaluation, as shown in FIG. 5.

The response portion 106 specifies the operation to be performed if the min term portion is evaluated as false relative to the compared data byte. In particular, the finish bit (FIN) is set to one if the results of the equation is determined if the min term result is false; the back to initial (BINIT) is set to one if the evaluation process should return to the initial state (init) if the min term result is false. For example, in the case of min term M1, the FIN bit is set to zero and the BINIT bit of RINP1 is set to one, such that the equation would return to the INIT state if the min term result M1 was false, as shown in FIG. 5.

The equation identifier field 110 identifies the equation (or template if there is only one template in an equation) that the min term corresponds to.

Hence, the equation core 78 determines whether any specified equation has a template 62 that matches the incoming data stream. Based on the multiple simultaneous comparisons of the incoming data stream with the multiple templates 62, the equation core 78 can identify a matching equation, and generate the appropriate tag corresponding to the matched equation for help it to the switching fabric 25. If desired, the core 78 by also output a command to the header modifier 29 to modify the layer 2 header, the layer 3 header, or both, before transferring the data to the switch.

According to the disclosed embodiment, a network switch port includes a filter capable of performing multiple simultaneous comparisons between the incoming data stream of the data packet and multiple templates configured for identifying a corresponding protocol. Since the packet classifier module 24 can process any of the bytes of the IP frame 32, the packet classifier module 24 can interpret all the header information in the IP packet 32 from layer 3 up to layers 7 protocols. Moreover, the multiple simultaneous comparisons enables the network switch 12 to perform layer 3 switching for 100 Mbps and gigabit networks without blocking in the network switch. Finally, the multiple simultaneous comparisons in the order in which the data is received enables real time comparisons to be performed, as opposed to alternative schemes such as programmable logic arrays (PLAs), which would require the entire header to be received before processing can begin.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method, in a network switch, of evaluating an incoming data packet received at a network switch port, the method comprising:

receiving from a host controller a plurality of templates configured for simultaneous identification of respective data formats in the incoming data packet, each template having at least one min term configured for comparing a corresponding prescribed value to a corresponding selected byte of the incoming data packet;

storing min terms in a min term memory separate from the network switch port;

requesting and retrieving from the min term memory, the min terms that correspond to the selected byte as the selected byte is received by the network switch port;

comparing, by the network switch port, the retrieved min terms with the data bytes received to identify the incoming data packet, wherein said min term memory is contained in a min term manager and said min term manager includes linked memory which stores a linked list identifying relevant data bytes that are to be compared by the min terms stored in the min term memory and wherein the requesting and retrieving step is controlled by the network switch port, with the min term manager sending to the network switch port only information that is requested by the network switch port, wherein the requesting and retrieving step includes the network switch port requesting and retrieving from the min term manager a location of a first relevant byte, an address of the first relevant byte, and the location of the next relevant byte.

2. The method of claim 1, wherein a plurality of network switch ports are provided and the requesting and retrieving step is performed in sequence by each network switch port.

3. The method according to claim 1, wherein the network switch port requests a maximum of eight min terms per clock cycle.

4. The method according to claim 2, wherein the network switch ports are time slotted sequenced with each port operating in its own time slot.

5. The method according to claim 2, wherein eight network switch ports are provided.

6. A method of evaluating incoming data packets at a network switch, the network switch including a plurality of network switch ports and a min term manager separate from and in communication with each network switch port, the min term manager including a central min term memory, the method comprising:

receiving from a host controller a plurality of templates configured for simultaneous identification of respective data formats in an incoming data packet, each template configured for identifying a prescribed format within the incoming data packet and having at least one min term configured for comparing a corresponding prescribed value to a corresponding selected byte of the incoming data packet;

storing each of the min terms in the central min term memory;

simultaneously comparing bytes of the incoming data packet with a plurality of the templates by fetching, for each byte, a group of the stored min terms from the central min term memory and simultaneously comparing at a certain network switch port the corresponding byte with the corresponding fetched group of the stored min terms; and generating a comparison result based on min term results from the comparisons of the bytes relative to the plurality of templates.

7. The method according to claim 6, wherein the fetching step includes the certain network switch port fetching from the min term manager data including a location of a certain byte, an address of the certain byte, the number of min terms associated with the certain byte and the location of the byte which follows the certain byte.

8. The method according to claim 6, wherein eight network switch ports are provided and the fetching step is performed in sequence by each network switch port.

9. The method according to claim 6, wherein said fetching step is controlled by said certain network switch port.

10. A network switch configured for evaluating an incoming data packet, comprising:

a min term controller configured for storing min term values configured for simultaneous comparison with corresponding incoming data bytes;

a plurality of network switch ports separate from and in communication with a central min term memory, each network switch port including:

a min term controller configured fetching min term values from the central min term memory;

a min term generator configured for simultaneously comparing a received byte of the incoming data packet with the fetched min terms corresponding to the received byte and generating respective min term comparison results; and an equation core configured for generating a frame tag identifying the incoming data packet based on the min term comparison results relative to the templates, wherein the min term controller is constructed and arranged to fetch from a min term manager data including a location of a certain byte, an address of the certain byte, the number of min terms associated with the certain byte and the location of the byte which follows the certain byte.

11. The switch according to claim 10, wherein eight network switch ports are provided and the network switch ports are constructed and arranged to fetch the data in sequence.

12. The switch according to claim 10, wherein each of the network switch ports is constructed and arranged to control fetching of the min terms.

13. The switch according to claim 10, wherein said network switch ports are time slotted sequenced with each network switch port operating in its own time slot.

* * * * *